United States Patent
Heimermann et al.

(10) Patent No.: US 7,595,722 B2
(45) Date of Patent: Sep. 29, 2009

(54) BIDIRECTIONAL ROTARY DEVICE FOR MENU NAVIGATION

(75) Inventors: Matthias Heimermann, Wolfenbuettel (DE); Heino Wengelnik, Wolfsburg (DE); Carsten Schnier, Salzgitter (DE)

(73) Assignee: Volkswagen AG, Wolfsburg (DE)

( * ) Notice: Subject to any disclaimer, the term of this patent is extended or adjusted under 35 U.S.C. 154(b) by 986 days.

(21) Appl. No.: 10/416,639

(22) PCT Filed: Oct. 9, 2001

(86) PCT No.: PCT/EP01/11670

§ 371 (c)(1),
(2), (4) Date: Oct. 10, 2003

(87) PCT Pub. No.: WO02/40307

PCT Pub. Date: May 23, 2002

(65) Prior Publication Data

US 2004/0046751 A1 Mar. 11, 2004

(30) Foreign Application Priority Data

Nov. 14, 2000 (DE) .............................. 100 56 306
Aug. 11, 2001 (DE) .............................. 101 39 693

(51) Int. Cl.
*G09F 9/00* (2006.01)

(52) U.S. Cl. ................ 340/461; 345/163; 345/164; 345/167; 341/35; 200/336

(58) Field of Classification Search ............... 340/461; 345/163, 164, 167; 341/35; 200/336, DIG. 29

See application file for complete search history.

(56) References Cited

U.S. PATENT DOCUMENTS

| | | | | |
|---|---|---|---|---|
| 4,792,783 | A | * 12/1988 | Burgess et al. | 307/10.1 |
| 5,109,252 | A | * 4/1992 | Schott, Jr. | 399/83 |
| 5,239,700 | A | * 8/1993 | Guenther et al. | 455/158.4 |
| 5,270,689 | A | 12/1993 | Hermann | |
| 5,736,696 | A | 4/1998 | Del Rosso | |
| 5,739,744 | A | * 4/1998 | Roca et al. | 341/20 |
| 5,825,353 | A | * 10/1998 | Will | 345/184 |
| 6,005,299 | A | * 12/1999 | Hengst | 307/10.1 |

(Continued)

FOREIGN PATENT DOCUMENTS

DE         43 19 543         12/1994

(Continued)

OTHER PUBLICATIONS

Wired News, Nov. 7, 1999, Wired, issue 7.11.*

(Continued)

*Primary Examiner*—Toan N Pham
*Assistant Examiner*—Travis R Hunnings
(74) *Attorney, Agent, or Firm*—Kenyon & Kenyon LLP (57) ABSTRACT

In a multifunction operating device, e.g., for a vehicle, for selecting function groups and functions in a menu structure that may be represented on a display device, the operating device includes at least one two-directional rotating element. The two-directional rotating element may be arranged so that it may select function groups and/or functions in a menu plane. A second operating element may be provided for selecting the menu planes.

5 Claims, 6 Drawing Sheets

U.S. PATENT DOCUMENTS

| | | | |
|---|---|---|---|
| 6,031,518 A * | 2/2000 | Adams et al. | 345/156 |
| 6,087,601 A * | 7/2000 | Callender et al. | 200/5 A |
| 6,097,964 A * | 8/2000 | Nuovo et al. | 455/566 |
| 6,240,347 B1 * | 5/2001 | Everhart et al. | 701/36 |
| 6,373,472 B1 * | 4/2002 | Palalau et al. | 345/173 |
| 6,489,950 B1 * | 12/2002 | Griffin et al. | 345/168 |
| 6,556,222 B1 * | 4/2003 | Narayanaswami | 715/786 |
| 6,571,154 B2 * | 5/2003 | Worrell et al. | 701/1 |
| 6,742,410 B1 * | 6/2004 | Eschler et al. | 74/471 XY |

FOREIGN PATENT DOCUMENTS

| | | |
|---|---|---|
| DE | 197 15 360 | 10/1998 |
| DE | 198 43 421 | 3/2000 |
| DE | 199 41 960 | 3/2001 |
| EP | 0 366 132 | 10/1989 |
| EP | 0 831 504 | 3/1998 |
| EP | 0 940 295 | 9/1999 |
| EP | 1 016 566 | 7/2000 |

OTHER PUBLICATIONS

SoftLandMark MouseWheel Control, 2001, SoftLandMark.*
SoftLandMark Scroll Software, 2001, SoftLandMark.*
VoodooFiles MouseWheel Control, 1999, Voodoo Files.*

* cited by examiner

BIDIRECTIONAL ROTARY DEVICE FOR MENU NAVIGATION

FIELD OF THE INVENTION

The present invention relates to a multifunctional operating device, in particular for a vehicle, for preselecting and selecting function groups and functions within a menu structure representable on a display device, the multifunctional operating device having at least one bidirectional rotary element.

BACKGROUND INFORMATION

In the case of modern electronic devices in a vehicle, which constantly offer additional functions having more and more options, multifunctional operating elements, with the aid of which various functions of the attached devices are controllable, have been provided due to the limited space for the corresponding operating elements. Thus, European Published Patent Application No. 0 366 132 describes, for example, a multifunctional operating device for motor vehicles, where function groups (MENUS) and individual functions are selected with the aid of a rotary switch, and where an ENTER function can be triggered; one and the same bidirectional rotary switch being used for selecting menus and individual functions. In this context, the rotary switch mentioned has click-stop positions, to which menus or individual functions are assigned, the ENTER function being able to be triggered by an axial movement of the rotary switch. Such a multifunctional operating device is used, for example, to enter a destination in a navigation system. To this end, an alphanumeric keyboard is illustrated on a display unit, the user being able to move forwards and backwards in the alphanumeric keyboard with the aid of the bidirectional motion of the rotary switch. When the cursor is then situated on the desired alphanumeric character, it can be selected and read into the navigation system by moving the rotary switch axially. In addition, it is also described in German Published Patent Application No. 199 41 960 that the operating element can be designed as a cylinder, which is bidirectionally rotatable about its longitudinal axis, and is elastically movable with respect to the longitudinal axis.

It is an object of the present invention to provide a multifunctional operating device, which may be operated in a manner that may be more user-friendly and may further simplify the haptics of operation.

SUMMARY

This object may be achieved by providing a multifunctional operating device having the features described herein. Additional developments and further aspects are described herein.

An example embodiment of the present invention may provide for the bidirectional rotary element being arranged to have a rotational axis that extends in a direction substantially parallel to the surface of a vehicle part. Function groups and/or functions are bidirectionally preselected and selected within a menu level with the aid of the bidirectional, rotary element. The menu levels are selected, using a second operating device.

In this context, the second operating device may be realized by moving the bidirectional rotary element parallelly to the axis of rotation of the bidirectional rotary element. To form the second operating device, a further example embodiment may provide for the bidirectional rotary element being arranged as a rocker in the direction of the axis of rotation.

Another possibility is to provide a second operating device having one or two operating elements, which may be manipulable in a direction parallel to the axis of rotation of the bidirectional rotary element. The second operating device is positioned on or at least partially in the bidirectional rotary element and forms a structural unit with the rotary element.

According to an example embodiment of the present invention, the bidirectional rotary element is provided for preselection and/or selection in two directions on the display device, and the second operating device is provided for selection in two additional directions, e.g., perpendicular to the selection directions of the bidirectional rotary element.

According to a further example embodiment of the present invention, the second operating device is made up of one operating element per selection direction.

The bidirectional rotary element may be situated in the vehicle and positioned with respect to the display device in such a manner, that the function groups and functions on the display device are selected in the sense of the rotational directions of the bidirectional rotary element.

An example embodiment of the present invention may provide that, after at least one function is preselected and/or selected by rotatably manipulating the bidirectional rotary element, the function may be activated by manipulating the second operating device. In the case of functions that are relevant to safety or subject to a charge, such as the dialing of a telephone number, it may be possible to provide deliberate activation of these functions, in order to prevent unintentional triggering of such functions.

The bidirectional rotary element may take the form of a large-sized set wheel, so that it may easily be gripped, even without or with little eye contact of the user, and manipulated in a haptically simple manner, for example, by the ball of the thumb.

At least in the case of individual function groups and/or functions, it may be provided that, after preselection of the function group and/or function, the preselected function groups and/or function are automatically selected and/or activated. To ensure that the function group and/or function was actually preselected, a further example embodiment may provide for the preselected function group and/or function first being automatically selected and/or activated when a selected time span has elapsed after preselection.

In a further example embodiment of the present invention, it may be indicated that further switches and/or push-buttons are situated in direct haptic proximity, next to the bidirectional operating element. In this connection, in haptic proximity means that push-button switches may be manipulated simultaneously by the fingers of the same hand by which the bidirectional operating element or the rotary manipulation wheel may be scrolled. By this arrangement, individual, predefined selection functions, which are controllable by scrolling, may be selected on the display device.

In addition, operating elements, e.g., push-button switches, which are individually assigned to the primary function groups, may be provided for the selection of primary function groups, e.g., for the selection of individual, attached devices and/or groups of devices.

According to a further example embodiment of the present invention, the bidirectional rotary element is sunk into the surface of a vehicle part to such an extent, that the rotary element may be easily manipulable and the axis of rotation may be already below the surface of the vehicle part.

In an example embodiment of the present invention, it may be indicated that the bidirectional operating element, together with the second operating device, is arranged spatially and structurally separately from the display device, but is not functionally separate from it. This may allow the display device to be arranged in an optimal, optical monitoring position for the occupants. Independently of this, the operating device is placed in the optimum, haptic operating position. It may be inevitable that the optimum, optical monitoring position may not necessarily be the optimum haptic position for operating the multifunctional operating device. For this reason, this very separation of the display device and operating device may be provided, because, first of all, the optical position, and secondly, the haptic position may only be optimally arranged by themselves.

The present invention is represented in the figures of the drawing, in several exemplary embodiments.

DETAILED DESCRIPTION

The multifunctional operating device according to an example embodiment of the present invention having display device 14 and operating device 10 is arranged for the selection of function groups (menus) and individual functions inside a menu structure represented on the same display device 14.

Figure 1:
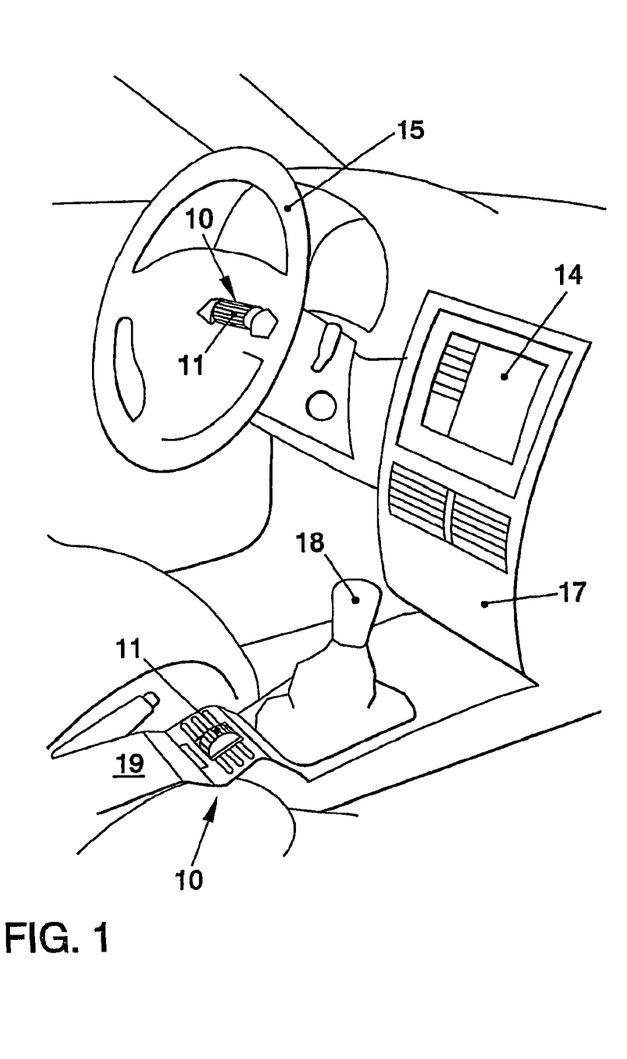
FIG. 1 is a schematic perspective view of an example embodiment of a multifunctional operating device of the present invention, arranged in the armrest or a center console of a vehicle and in the steering wheel of the same.
Figure 3:
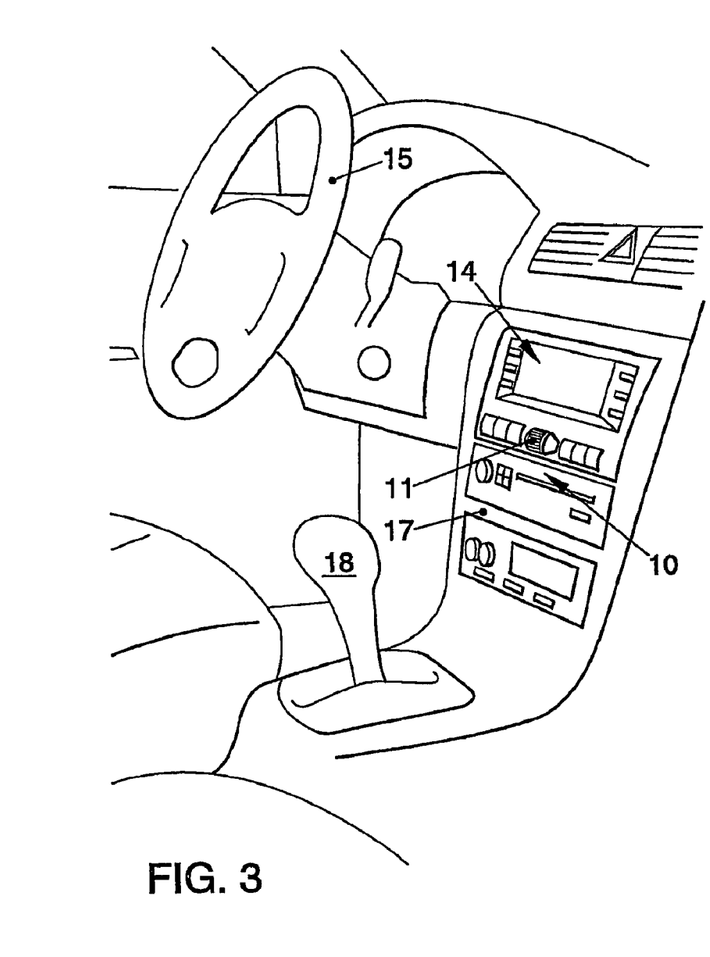
FIG. 3 is a schematic view of an example embodiment of a multifunctional operating device of the present invention, arranged in the instrument panel of a vehicle.
Figure 4:
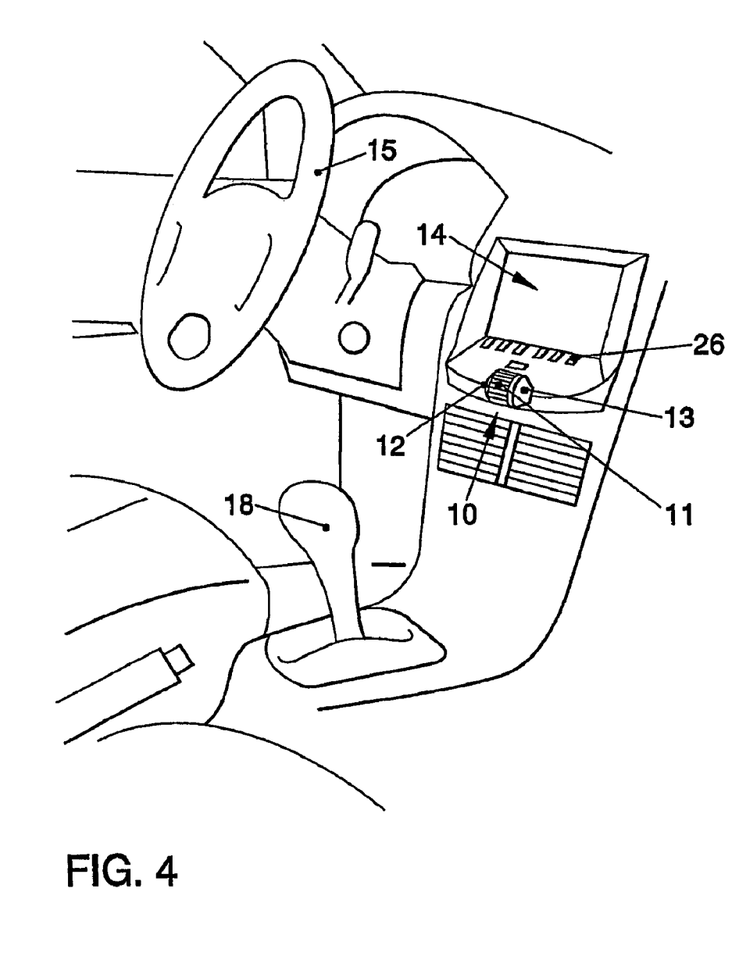
FIG. 4 illustrates a further example embodiment of the multifunctional operating device of the present invention.

For example, operating device 10 may be arranged in a steering wheel 15 a vehicle, see e.g., FIG. 1 of the drawing. Alternatively or in addition, operating device 10 of the present invention may be arranged in an instrument panel 17 of the vehicle, see, e.g., FIG. 3 or 4 of the drawing. Alternatively or in addition, it is also possible for operating device 10 to be arranged in a center console or armrest 19, or in a gearshift lever 18 of a vehicle. For this, reference is made to FIGS. 1 and 2 of the drawing.

Figure 2:
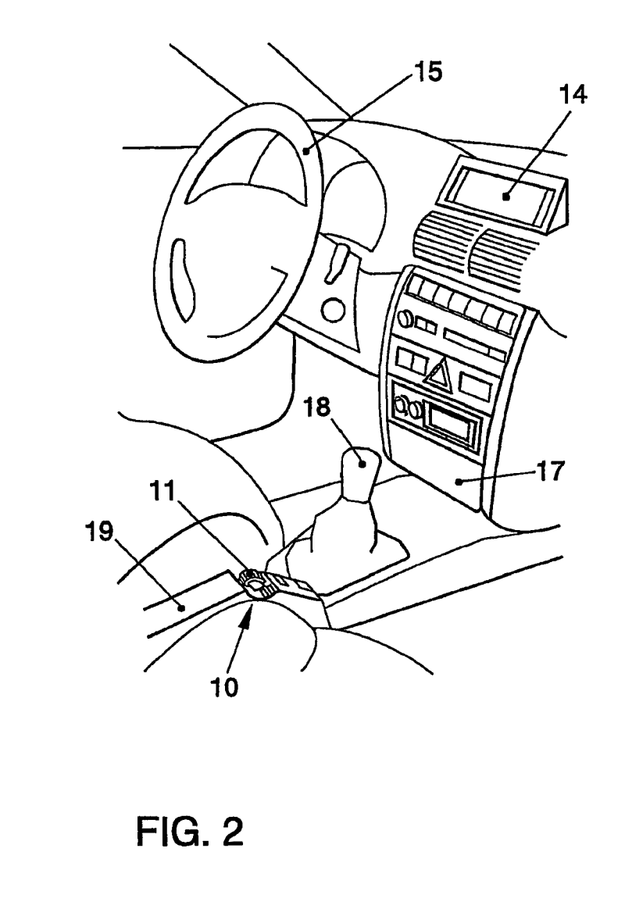
FIG. 2 is a schematic view of an example embodiment of a multifunctional operating device of the present invention, built into the armrest or a center console of a vehicle.

In FIG. 1 of the drawing, operating device 10, which forms, together with display device 14, the multifunctional operating device of an example embodiment of the present invention, is arranged both in steering wheel 15 and armrest 19 or the center console of a vehicle. In FIG. 2, operating device 10 is arranged exclusively in the armrest or the center console of the vehicle.

In the case of example embodiments in which operating device 10 is arranged in the region of armrest 19, see, e.g., FIG. 2, bidirectional rotary element 11 of operating device 10 takes the form of a large-sized set wheel.

Figure 5:
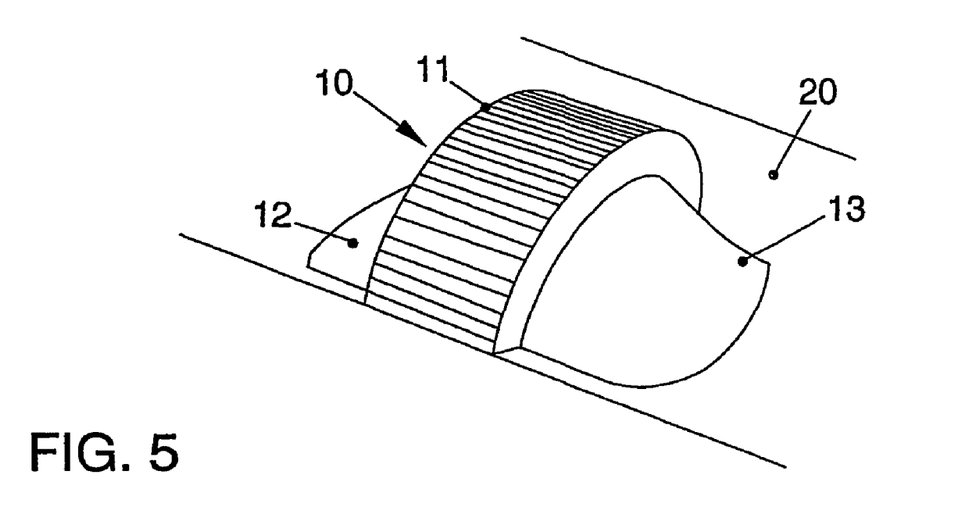
FIG. 5 is a perspective view of operating device 10.

In FIG. 5, operating device 10 is represented in detail as a unit. Operating device 10 has a bidirectional rotary element 11, which projects from the vehicle-part surface and optionally has click-stop positions, which are for haptically selecting functions and function groups and may be programmable as a function of the function groups and/or functions present in a menu level. Vehicle-part surface 20 may be formed by, for example, the upper side of a center console or an armrest 19 (FIGS. 1 and 2), or of a steering wheel 15 (FIG. 1) or instrument panel 17.

In this context, bidirectional rotary element 11 provided as a rotary manipulation wheel is arranged horizontally with respect to vehicle-part surface 20, so that the axis of rotation of the rotary manipulation roll or rotary element 11 is arranged in the plane, i.e., horizontally. Since the orientation of the horizontal axis of rotation is such, that bidirectional rotary element 11 may rotate or, so to say, roll in directions such as the selecting and preselecting directions on display device 14, the result is a suitable angular manipulability of bidirectional rotary element 11. The rotary-manipulation roll or bidirectional rotary element 11 may be installed with its axis of rotation in such a manner, that it, the axis of rotation, is arranged below vehicle-part surface 20. That is, the rotary-manipulation roll may be an absolutely round element, whose axis of rotation and rotational-axis suspension is to be arranged beneath vehicle-part surface 20 or the operator interface.

A second operating device 12 and 13 is arranged laterally to the rotary manipulation roll. For example, second operating device 12, 13 may be made up of two pushbutton elements, which may be manipulated in a direction parallel to the axis of rotation of bidirectional rotary element 11.

Another example embodiment of the multifunctional operating device of the present invention has a one-piece or two-piece operating device 12, 13, which is at least arranged in bidirectional rotary element 11 that essentially takes the form of a ring or is formed with ring-shaped edges.

Figure 6:
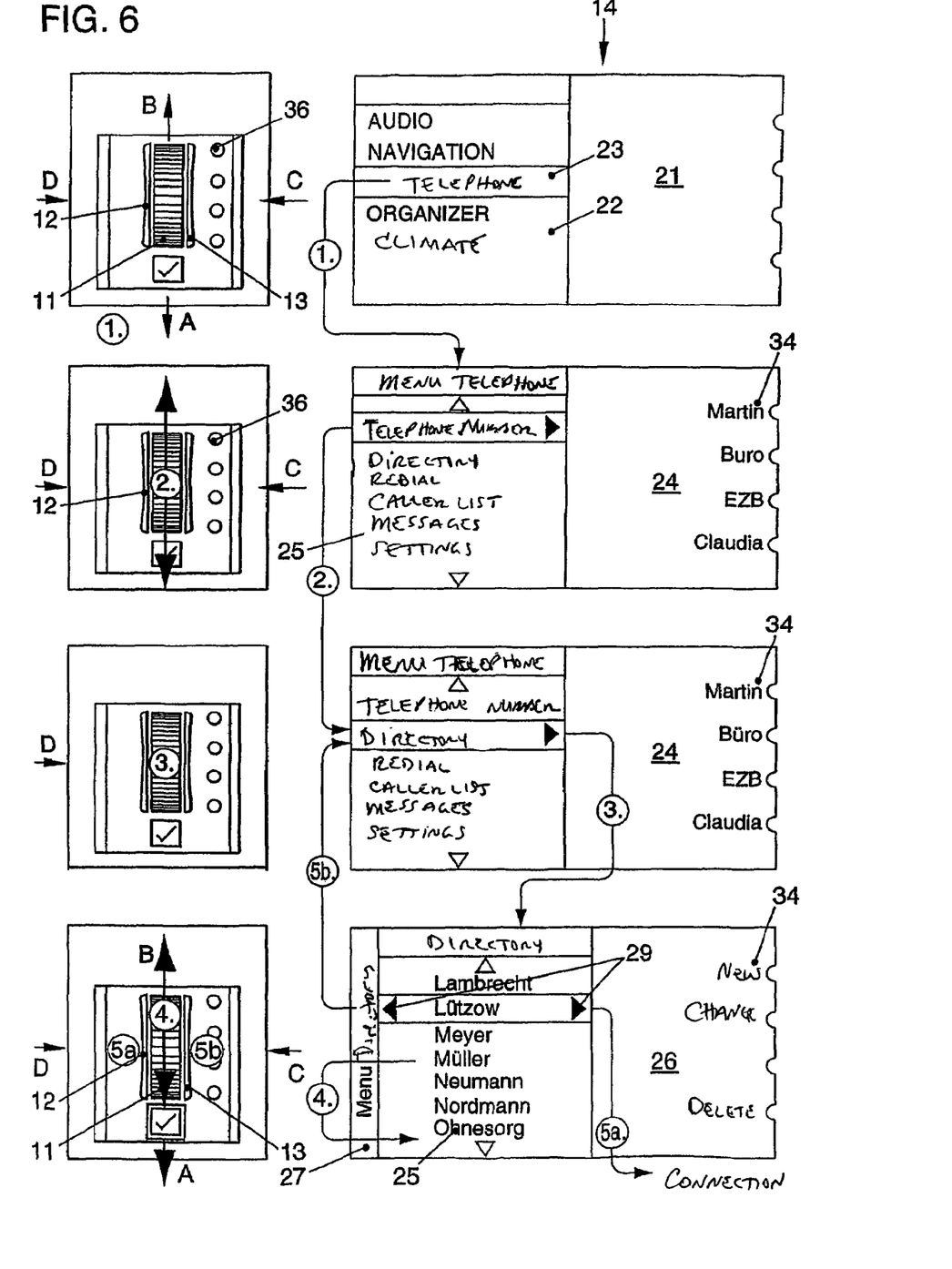
FIG. 6 illustrates a functional example of the multifunctional operating device of the present invention, using a telephone service.

FIG. 6 illustrates an example of the functioning method of an example embodiment of the multifunctional operating device according to the present invention. As previously explained, the multifunctional operating device is essentially made up of bidirectional rotary element 11 and second operating device 12, 13, which interact with spatially separated display device 14 that is arranged in instrument panel 17.

After the multifunctional operating device is switched on, a main menu 21 having a number of function groups 22 or attached devices appears on display device 14. In the exemplary embodiment, these include one or more audio devices, telephone equipment, a navigation device, an organization program, and an air conditioner, etc. By rotating bidirectional rotary element 11 in direction A, selection marking 23 jumps from function group 22 "AUDIO" to function group "TELEPHONE". After the expiration of a predefined time span, which may ensure that the function group "TELEPHONE" is also the function group 22 actually desired, this is selected and telephone menu 24 is represented on display device 14 (step 1). One may select between various functions 25 by manipulating rotary element 11 in direction A or B. In this case, the telephone book is selected via step 2. By manipulating operating element 12 in direction D, the display of display device 14 jumps into secondary menu 26 of the telephone book (step 3). In this case, a function 25 may be selected in turn (step 4) by rotating rotary element 11. This function may be a function that has to be paid for, so that it is only activated by manipulating operating element 12 in direction D (step 5a). By manipulating operating element 13 in direction C, the user arrives again at a superordinate menu level (step 5b). Using graphical representation 27 and 28, a user may immediately recognize how many superordinate menu levels exist. Arrow 29 indicates that, at least for this function or function group, further menu levels are present below and/or above the selected menu level.

On menu levels 24 and 26, symbolic operating elements 34 are represented at the right edge of display device 14. These correspond to actual operating elements 36, which are formed as so-called softkeys. Operating elements 36 are assigned different, selected functions as a function of the menu level or menu branch.

Figure 7:
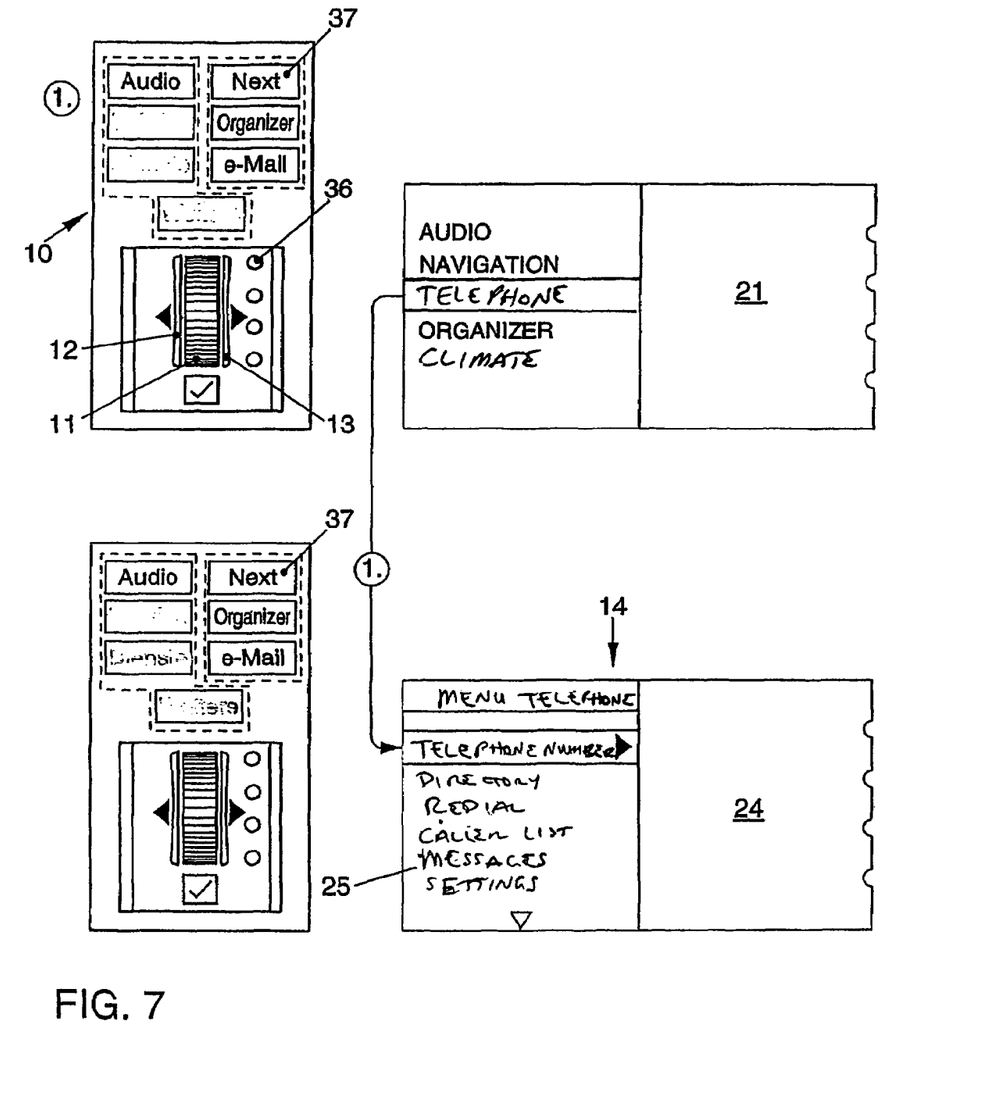
FIG. 7 illustrates a further functional example, using a telephone service.

In addition to bidirectional rotary element 11, second operating elements 12, 13, and softkeys 36, operating device 10 represented in FIG. 7 includes further operating elements 37, which, for example, take the form of pushbuttons. Operating elements 37 are each assigned to special primary function groups 22. These primary function groups may first of all be the operator menu of individual, attached devices, such as a radio and navigation device, or groups of devices. Thus, for example, the operator menus of several AUDIO devices are combined under AUDIO. Because of operating elements 37, the functioning method of the multifunctional operating device differs slightly from that of FIG. 6. If the user wants to operate one of the attached devices listed in main menu 21, he then manipulates appropriate operating element 37, in this case the operating element for the telephone device. Display device 14 then shows telephone menu 24 immediately. In the following, the operation is carried out in a manner analogous to that illustrated in FIG. 6.

Figure 8:
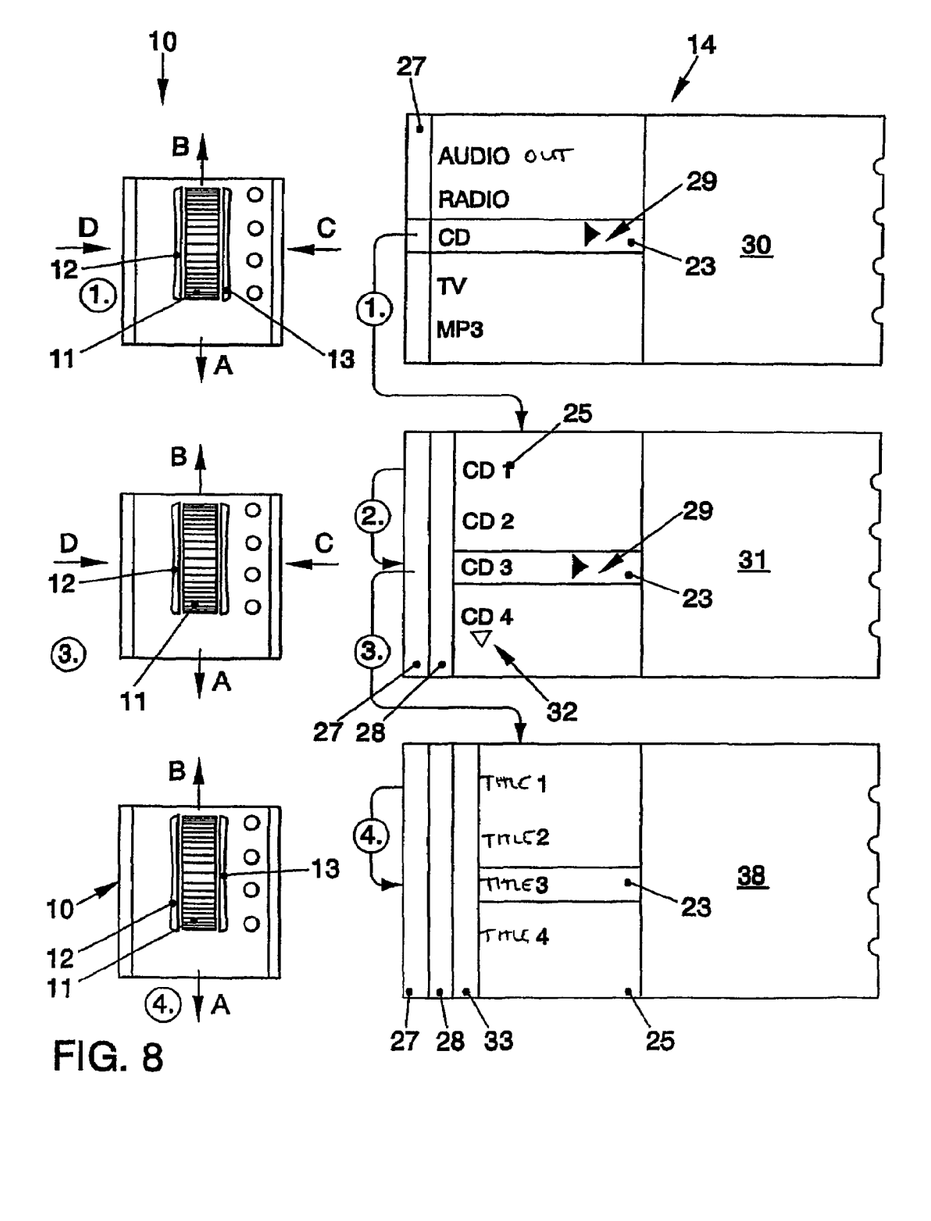
FIG. 8 illustrates a functional example, using an AUDIO menu.

Audio menu 30 illustrated in FIG. 8 includes the operation of several audio devices, such as radio, CD changer, TV, and an MP3 player, etc. In addition, one more function, "AUDIO DEVICES OFF", is provided. By rotating rotary element 11 in direction A or B, a function group 22 is also preselected and selected in this case. Selection marking 23 is on the selected function group. In FIG. 8, it is the CD changer.

Arrow 29 appearing inside the selection marking indicates that further secondary menus exist for the function group, the further secondary menus being preselectable by manipulating operating element 12 in direction D.

Bar 27 on display device 14 indicates that audio menu 30 is not the main menu of the multifunctional operating device. One may jump to the main menu by manipulating operating element 13 in direction C.

If operating element 12 is now manipulated in direction D, the display jumps to the underlying menu level, and menu image 31 appears on display device 14. In this case, display bars 27, 28 may indicate that the user is on the third menu level, i.e., two superordinate levels exist. Arrow 32 indicates that not all functions 25 of this menu level are momentarily represented on display device 14.

These functions are brought into the display by rotatably manipulating rotary element 11.

In this case as well, a function, e.g., an available CD, may be preselected and selected (step 2) by rotating rotary element 11 in direction A or B, and, by manipulating operating element 12 in direction D, a jump is made to subjacent menu 38 (step 3), whose level is now indicated by bars 27, 28, and 33.

When a title (function) 25 is preselected and selected by rotatably manipulating rotary element 11, the CD changer is simultaneously activated, and the user may listen to this title.

What is claimed is:

1. A multifunctional operating device arranged to at least one of preselect and select function groups and functions within a menu structure representable on a display device, comprising:

at least one bidirectional rotary element configured to at least one of preselect and select at least one of function groups and functions within a menu level, the bidirectional rotary element arranged in the form of a rotary manipulation roll having an axis of rotation horizontal with respect to a surface of a component that accommodates the rotary manipulation roll; and at least one second operation device configured to at least one of preselect and select subordinate and superordinate menu levels;

wherein the at least one second operation device includes at least a part that is movable in a direction parallel to the axis of rotation of the bidirectional rotary element; and wherein the second operation device includes a rocker of the bidirectional rotary element in a direction of the axis of rotation.

2. A multifunctional operating device arranged to at least one of preselect and select function groups and functions within a menu structure representable on a display device, comprising:

at least one bidirectional rotary element configured to at least one of preselect and select at least one of function groups and functions within a menu level, the bidirectional rotary element arranged in the form of a rotary manipulation roll having an axis of rotation horizontal with respect to a surface of a component that accommodates the rotary manipulation roll; and at least one second operation device configured to at least one of preselect and select subordinate and superordinate menu levels;

wherein the at least one second operation device includes at least a part that is movable in a direction parallel to the axis of rotation of the bidirectional rotary element; and wherein the second operation device includes one of one and two operating elements, the second operation device arranged one of on, at and at least partially in the bidirectional rotary element.

3. A multifunctional operating device arranged to at least one of preselect and select function groups and functions within a menu structure representable on a display device, comprising:

at least one bidirectional rotary element configured to at least one of preselect and select at least one of function groups and functions within a menu level, the bidirectional rotary element arranged in the form of a rotary manipulation roll having an axis of rotation horizontal with respect to a surface of a component that accommodates the rotary manipulation roll; and at least one second operation device configured to at least one of preselect and select subordinate and superordinate menu levels;

wherein the at least one second operation device includes at least a part that is movable in a direction parallel to the axis of rotation of the bidirectional rotary element; and wherein the bidirectional rotary element is configured for at least one of preselection and selection in two directions, the second operation device configured for selection in two directions perpendicular to the two directions of the bidirectional rotary element.

4. A multifunctional operating device arranged to at least one of preselect and select function groups and functions within a menu structure representable on a display device, comprising:

at least one bidirectional rotary element configured to at least one of preselect and select at least one of function groups and functions within a menu level, the bidirectional rotary element arranged in the form of a rotary manipulation roll having an axis of rotation horizontal with respect to a surface of a component that accommodates the rotary manipulation roll; and at least one second operation device configured to at least one of preselect and select subordinate and superordinate menu levels;

wherein the at least one second operation device includes at least a part that is movable in a direction parallel to the axis of rotation of the bidirectional rotary element; and wherein the part is formed integrally with the bidirectional rotary element.

5. A multifunctional operating device arranged to at least one of preselect and select function groups and functions within a menu structure representable on a display device, comprising:

at least one bidirectional rotary element configured to at least one of preselect and select at least one of function groups and functions within a menu level, the bidirectional rotary element arranged in the form of a rotary manipulation roll having an axis of rotation horizontal with respect to a surface of a component that accommodates the rotary manipulation roll; and at least one second operation device configured to at least one of preselect and select subordinate and superordinate menu levels;

wherein the at least one second operation device includes at least a part that is movable in a direction parallel to the axis of rotation of the bidirectional rotary element; and wherein which of a subordinate and superordinate menu level is at least one of preselected and selected by the at least one second operation device depends on one of a direction of movement of the at least one second operation device and which of at least two operation elements of the at least one second operation device is manipulated.

* * * * *

UNITED STATES PATENT AND TRADEMARK OFFICE
CERTIFICATE OF CORRECTION

| | | |
|---|---|---|
| PATENT NO. | : 7,595,722 B2 | Page 1 of 1 |
| APPLICATION NO. | : 10/416639 | |
| DATED | : September 29, 2009 | |
| INVENTOR(S) | : Heimermann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Fifteenth Day of February, 2011

David J. Kappos
*Director of the United States Patent and Trademark Office*